Patented Mar. 31, 1936

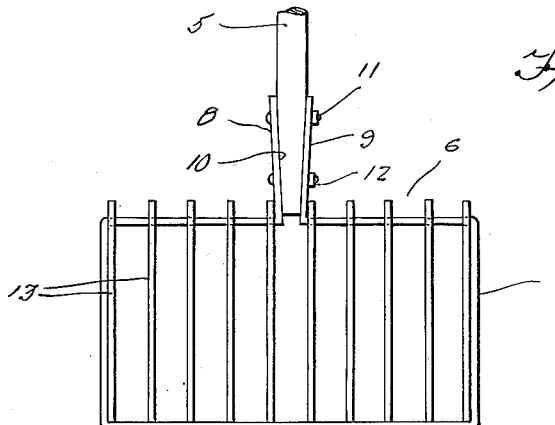
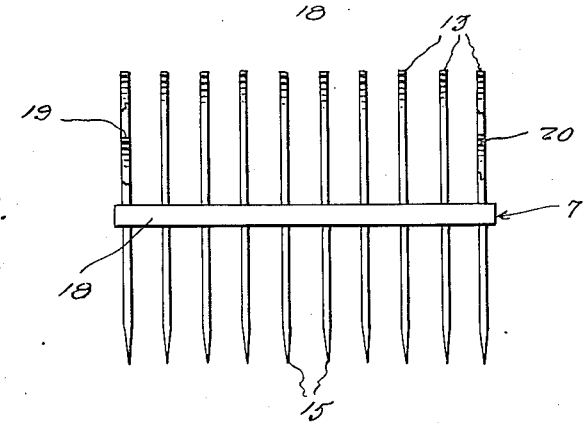
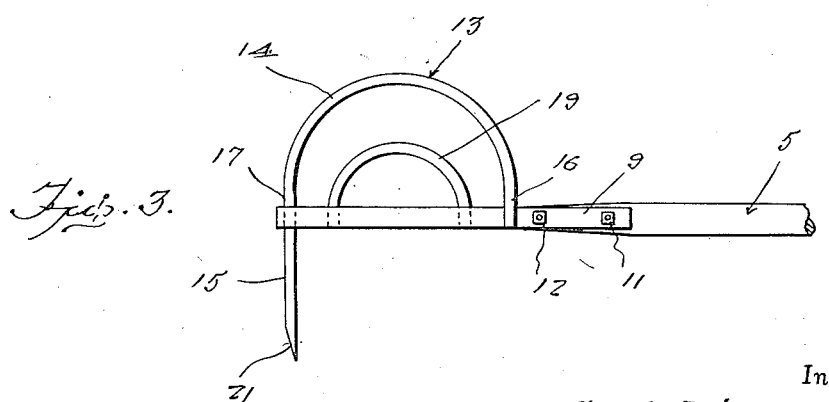

2,035,799

UNITED STATES PATENT OFFICE 2,035,799

CLAM RAKE

George A. Dippel, Sag Harbor, N. Y.

Application February 23, 1935, Serial No. 7,903

3 Claims. (Cl. 37—119)

My invention relates generally to implements for digging, raking, and carrying material, and particularly to a rake particularly adapted to raking and lifting clams from a clam bed, and an important object of my invention is to provide a rake of the character indicated which is efficient, adequate in capacity, and easily manipulated.

Another important object of my invention is to provide a rake of the character indicated which is strong and simple in construction and capable of being manufactured at a relatively low cost.

Other objects and advantages of my invention will be apparent from a reading of the following description in connection with the drawing, wherein for purposes of illustration I have shown a preferred embodiment of my invention.

In the drawing:—

Figure 1 is a bottom plan view of the embodiment.

Figure 2 is an elevational view of the front thereof.

Figure 3 is an end elevational view thereof.

Referring in detail to the drawing, the numeral 5 generally designates a suitable handle of the required length to one end of which is attached the rake-head which is generally designated 6.

The rake-head is composed of a generally rectangular frame 7 of flat bar material one longitudinal side of which is broken and the resulting ends equipped with lateral extensions 8 and 9, respectively, which engage the flat tapered sides 10 of the handle 5 and are bolted thereto by bolts 11 and 12 which traverse the extensions 8 and 9 and the tapered end of the handle as indicated in Figures 1 and 3, whereby the frame is fastened to the handle securely yet removably in a plane which coincides substantially with the axis of the handle, and the frame extends to equal distances on opposite sides of the handle.

J-shaped bars 13 which consist of a semi-circular part 14 and a straight tangential part 15 have the end 16 thereof fastened to the back side of the back longitudinal member of the frame 7 and the portion 17 between the portions 14 and 15 secured to the back or inner side of the longitudinal part 18 of the frame 7, so that the tine part 15 extends on the side of the frame opposite that on which the semi-circular part 14 extends as clearly shown in Figure 3.

As indicated in Figures 1 and 2 a plurality of the members 13 are attached in the manner indicated to the frame, with the extreme end ones of the members 13 positioned close to the opposite ends of the frame, and the other members 13 spaced within the extreme end members at such distances as to permit, for instance, under-sized clams to fall from the rake while holding full-sized clams.

Attached to each end of the frame 7 is a smaller concentric semi-circular bar 19 and 20, respectively, which are concentrically spaced from and within the extreme end members 13 so as to retain full-sized clams within the frame while permitting under-sized clams to fall therefrom.

The lower ends of the tines 15 are sharpened and rearwardly beveled as indicated at 21 so as to dig into the clam bed when the rake is applied thereto with a downward movement, so as to dig into the bed and lift the clams therefrom upon manipulation of the rake handle 5 in a direction to cause the clams displaced by the tines 15 to move into the basket formed by the frame and the semi-circular portions 14 of the members 13, so that the clams may be brought to the surface by the operator.

Although I have shown and described herein a preferred embodiment of my invention, it is to be definitely understood that I do not desire to limit the application of the invention thereto, and any change or changes may be made in the materials and in the structure and arrangement of the parts within the spirit of the invention and the scope of the subjoined claims.

What is claimed is:—

1. A rake of the character described comprising a generally rectangular frame having a handle attached to one side thereof, a plurality of J-shaped members disposed transversely of said frame and longitudinally spaced along the frame, said members having the curved portions thereof attached to opposite sides of the frame and the end portion thereof extending on the side of the frame opposite the curved portions and constituting tines.

2. A rake of the character described comprising a generally rectangular frame having a handle attached to one side thereof, a plurality of J-shaped members disposed transversely of said frame and longitudinally spaced along the frame, said members having the curved portions thereof attached to opposite sides of the frame and the end portion thereof extending on the side of the frame opposite the curved portions and constituting tines, the ends of said curved portions being attached to inner and outer faces of the sides of the frame.

3. A rake of the character described comprising a generally rectangular frame having a handle attached to one side thereof, a plurality of J-shaped members disposed transversely of said frame and longitudinally spaced along the frame, said members having the curved portions thereof attached to opposite sides of the frame and the end portion thereof extending on the side of the frame opposite the curved portions and constituting tines, and a smaller curved member attached to each end of said frame and spaced radially inwardly of said curved portions.

GEORGE A. DIPPEL.